Patented Oct. 22, 1935

2,018,563

UNITED STATES PATENT OFFICE 2,018,563

ELECTRIC CELL

Martin L. Martus, Woodbury, and Edmund H. Becker, Waterbury, Conn.

No Drawing. Application February 27, 1932, Serial No. 595,654

15 Claims. (Cl. 136—116)

This invention relates to electric cells; and it comprises a primary cell of the type having a caustic electrolyte and a zinc anode wherein said electrolyte contains minimal amounts of tin and/or magnesium compounds and also advantageously contains an organic reducing agent, for example, hydroquinone, or a salt of formic acid, tartaric acid, etc.; all as more fully hereinafter set forth and as claimed.

At present the most common type of cell having a caustic electrolyte and a zinc anode is the so-called Lalande cell. This cell employs a copper—copper oxid electrode as a cathode. A type which is rapidly becoming popular, however, is the so-called "air depolarizer cell" which employs an activated carbon cathode depolarized by atmospheric oxygen. These two types of cells in some respects and for the present purposes have quite similar characteristics.

If a circuit connected to one of the above cells is closed immediately after setting up the cells, and a steady flow of current maintained the electrodes will remain clean and active and practically free from local action. However, on light intermittent work, or when the cells are held in reserve, considerable trouble is experienced due to the fouling of the electrodes, causing local action and internal short circuits which shorten the life and increase the internal resistance of the cell.

The above types of cells are also subject to a detrimental "shelf loss". When these cells are on open circuit there is a gradual voltage drop and a loss of ampere hour capacity, the cause for which has never been exactly determined. To some extent this shelf loss is known to be due to copper going into solution in the electrolyte, but experiments have shown that there are several other factors involved.

It has been found in practice that the presence of small amounts of certain materials in the alkaline electrolyte affects the performance of the cells in a favorable manner, reducing the detrimental effects of standing on open circuit. For example silicate of soda is often added and this material produces some improvement. In a prior Patent No. 1,834,250, whereon the present invention is in some respects an improvement, there is described and claimed the addition of iodin compounds to the electrolyte. Only small amounts are added but they make the operation of the cells more regular.

We have found that greater improvement in the operation of the cells is effected when the alkaline electrolyte contains small amounts of a soluble stannate and/or a magnesium compound. Upon the addition of a little magnesium chlorid, or carbonate, some magnesia separates but some stays in solution; and such an addition is effective for our purposes. Sodium stannate can be added directly as the commercial preparation and is highly effective either alone or in combination with the magnesium compounds.

In connection with the use of the stannate and/or magnesium compounds we have found it highly desirable to employ an organic reducing agent, such as hydroquinone, or the salts of formic acid, tannic acid, tartaric acid, etc. All types of organic reducing agents appear applicable. If the reducing material is an acid, it may be employed in the form of any of its soluble alkaline metal salts. The exact function of the reducing agent is not known but it has been found that the two electrodes remain brighter when these compounds are used.

The materials enumerated may be used in varying proportions. Good results have been obtained with the following ingredients in the proportions indicated, these data designating the number of grams of the materials added to 450 cc. of a caustic soda or potash electrolyte having a gravity of 27° Bé.

1. 5 g. sodium stannate,
2. 5 g. magnesium carbonate,
3. 5 g. sodium stannate; 5 g. magnesium chlorid,
4. 10 g. sodium stannate; 10 g. hydroquinone,
5. 5 g. sodium stannate; 5 g. sodium formate,
6. 5 g. sodium stannate; 5 g. sodium formate, 3 g. magnesium chlorid,
7. 5 g. sodium stannate; 5 g. magnesium chlorid; 10 g. sodium potassium tartrate,
8. 5 g. magnesium phosphate The reducing agents used in our invention can be added in proportions ranging from about 5 to 50 grams to 450 cc. of electrolyte or say from 1 to 10 per cent by weight of the caustic electrolyte. About 2 per cent is usually sufficient. The tin compounds can be added in proportions ranging from about 1 to 2 per cent by weight. The magnesium compounds can be added in proportions of approximately 0.5 to 1 per cent. When both a stannate and a magnesium compound are employed, we generally use from 0.5 to 1 per cent of each. When a stannate and a magnesium compound are both added to the water and caustic alkali electrolyte it is desirable to add the magnesium compound first and to dissolve this before adding the stannate. These compounds can be added in the form of various soluble tin and magnesium salts having an inert negative radical. It is obvious, of course, that upon the addition of a tin salt, the reaction with the caustic alkali forms a stannate. Hence when we refer to adding a stannate to the electrolyte this includes the addition of any salts forming a stannate upon reaction with the caustic. The iodids of our acknowledged patent can be employed in connection with the above chemicals. When an iodid is employed, however, the reducing agent can be omitted. It is also sometimes advantageous to add a per cent or so of zinc oxid. The latter is formed upon use of the cell and, if a small quantity is added to the cell when freshly made up, the voltage characteristics and operation of the cell are stabilized.

As to the reason for the improvement effected by the presence of the above chemicals we are uncertain and we content ourselves with noting the fact. In the presence of the described additions, the zinc remains cleaner and the same is true of the copper—copper oxid electrode of the Lalande cell. There is a distinct improvement in the brightness of appearance of both electrodes. And the customary drop in voltage is not so pronounced. The cell is much more resistant to open circuit conditions; in fact so much so that it may be safely used as a reserve battery for many purposes.

The reducing agent seems to benefit the cathode more than the zinc electrode while the effect of the magnesium compounds is the reverse. The stannate appears to have a somewhat different effect than the magnesium compound. The two effects are not independent, however, since the total effect produced when both compounds are present is greater than the sum of the two actions individually. It may be that either the stannate or the magnesium compound promotes the conjoint action of the other with the reducing agent. To produce the best results both a magnesium compound and a stannate should be present in addition to the organic reducing agent.

A cell made up under the present invention was provided with a caustic electrolyte containing, per 450 cc., 5 grams commercial sodium stannate and 10 grams commercial hydroquinone. To this preparation was added 3 grams commercial crystallized magnesium chlorid. An incidental white precipitate separated. An exactly similar body of electrolyte was then prepared save that 10 grams of commercial sodium formate was used in lieu of 10 grams of hydroquinone. The two cells on test behaved practically alike; and both appeared better upon standing on open circuit than did an ordinary cell made in exactly the same manner save that the electrolyte did not receive these additions.

What we claim is:

1. In an electric cell of the usual Lalande type having a zinc anode, a caustic alkali electrolyte solution containing about 1 per cent by weight of an added magnesium salt of the type of magnesium chlorid, magnesium carbonate and magnesium phosphate and about 2 per cent of an added organic reducing agent.

2. In an electric cell of the usual Lalande type having a zinc anode, a caustic alkali electrolyte solution containing from 1 to 2 per cent of an added alkali metal stannate, from 1 to 2 per cent of an added magnesium salt selected from a class consisting of the chlorid, carbonate and phosphate and from 1 to 10 per cent of an added organic reducing agent.

3. In an electric cell of the usual Lalande type having a zinc anode, a caustic alkali electrolyte solution containing about 1 per cent of an added alkali metal stannate, about 1 per cent of an added magnesium salt selected from a class consisting of the chlorid, carbonate and phosphate and about 2 per cent of an added alkali metal formate.

4. In an electric cell of the usual Lalande type having a zinc anode, a caustic alkali electrolyte solution containing about 1 per cent by weight of an added magnesium compound and about 2 per cent of an added organic reducing agent selected from a class consisting of an alkali metal formate and hydroquinone.

5. In an electric cell of the Lalande type having a zinc anode, a caustic alkali electrolyte solution containing from about 1 to 2 per cent by weight of an alkali metal stannate and about 2 per cent of an organic reducing agent.

6. In an electric cell of the Lalande type having a zinc anode, a caustic alkali electrolyte solution containing about 1 per cent by weight of an added alkali metal stannate and about 2 per cent of an added organic reducing agent selected from a class consisting of hydroquinones and the alkali metal salts of formic, tartaric and tannic acids.

7. In an electric cell of the Lalande type having a zinc anode, a caustic alkali electrolyte solution containing from about 1 to 2 per cent of sodium stannate, from about 0.5 to 1 per cent of magnesium chlorid and from about 1 to 10 per cent of sodium formate.

8. In an electric cell of the usual Lalande type having a zinc anode, a caustic alkali electrolyte solution containing from about 1 to 10 per cent by weight of an organic reducing agent and at least about 0.5 per cent by weight of added metallic salts selected from a group consisting of magnesium chlorid, carbonate and phosphate.

9. In an electric cell of the usual Lalande type having a zinc anode, a caustic alkali electrolyte solution containing from about 1 to 10 per cent by weight of an organic reducing agent and at least about 0.5 per cent by weight of an added alkali metal stannate.

10. In an electric cell of the usual Lalande type having a zinc anode, a caustic alkali electrolyte solution containing from about 1 to 10 per cent by weight of an organic reducing agent and from about 0.5 to 2 per cent by weight of added metallic salts selected from a group consisting of alkali metal stannates and magnesium chlorid, carbonate and phosphate.

11. The electric cell of claim 10 wherein the organic reducing agent is selected from a class consisting of an alkali metal formate and hydroquinone.

12. In an electric cell of the usual Lalande type having a zinc anode, a caustic alkali electrolyte solution containing from about 1 to 10 per cent by weight of an organic reducing agent selected from a group consisting of hydroquinones and alkali metal salts of formic, tartaric and tannic acids, and also containing from about 0.5 to 2 per cent of added metallic salts selected from a group consisting of alkali metal stannates and magnesium chlorid, carbonate and phosphate.

13. In an electric cell of the usual Lalande type having a zinc anode, a caustic alkali electrolyte solution containing from 1 to 2 per cent by weight of an added alkali metal stannate and from about 1 to 10 per cent of an added organic reducing agent selected from a class consisting of hydroquinones and the alkali metal salts of formic, tartaric and tannic acids.

14. The electric cell of claim 13 wherein the organic reducing agent is selected from a class consisting of a formate and hydroquinone.

15. In an electric cell of the usual Lalande type having a zinc anode, a caustic alkali electrolyte containing from 1 to 2 per cent of an added alkali metal stannate.

MARTIN L. MARTUS.
EDMUND H. BECKER.